Nov. 3, 1970    C. J. SNYDER    3,538,406
BATTERY-POWERED RECORDER
Filed Feb. 20, 1967    2 Sheets-Sheet 1
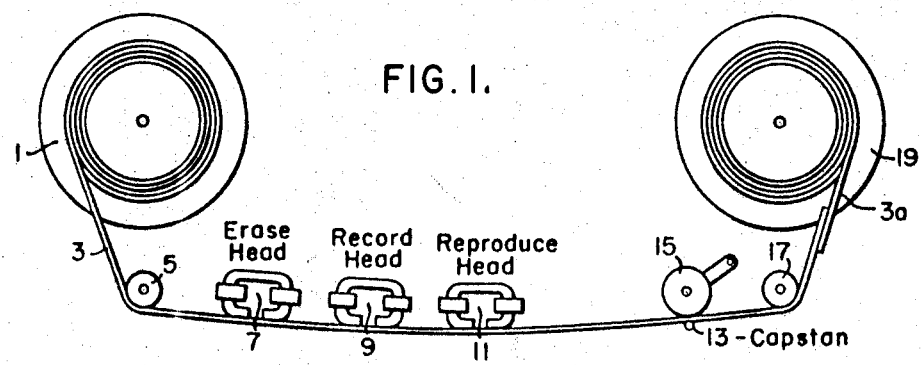
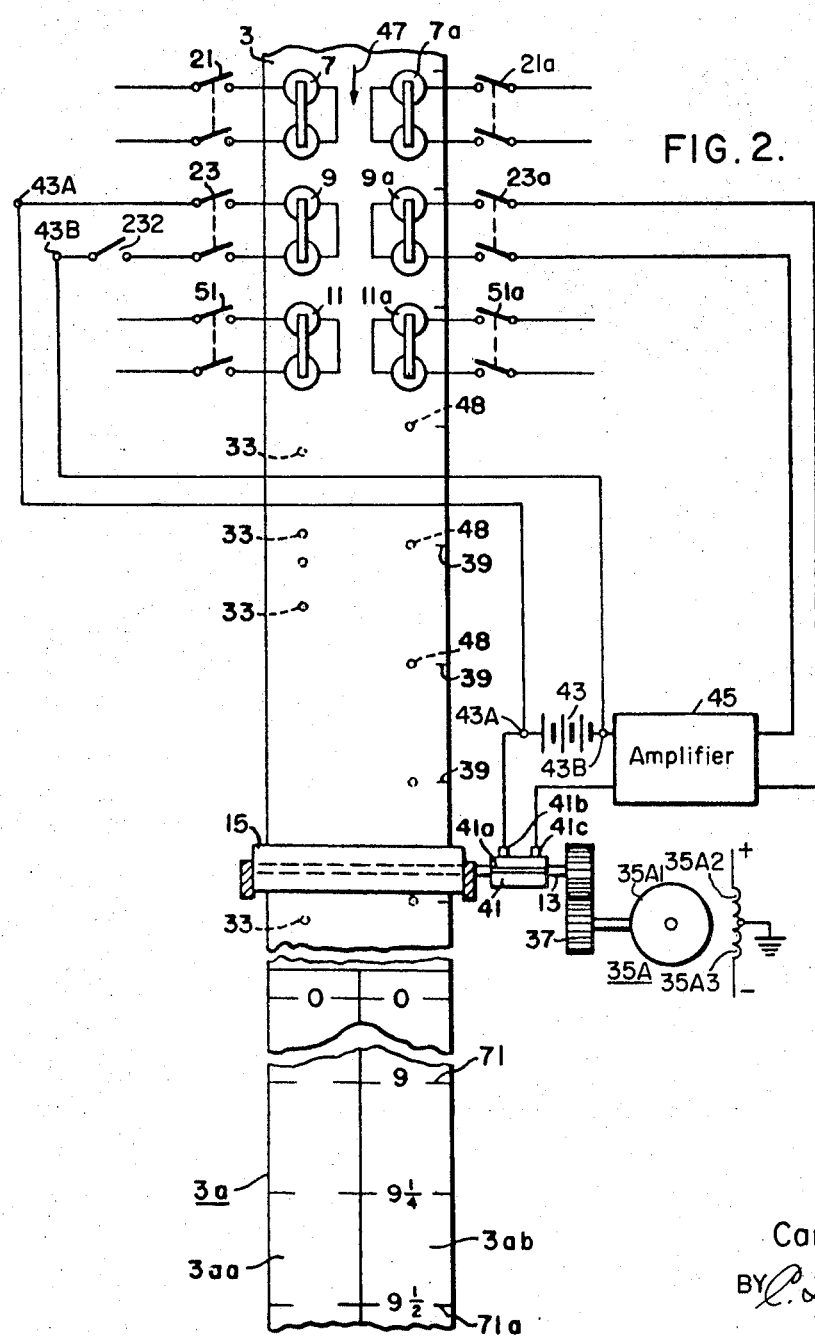
INVENTOR
Carl J. Snyder.
BY C. L. Freedman
ATTORNEY Nov. 3, 1970 C. J. SNYDER 3,538,406
BATTERY-POWERED RECORDER
Filed Feb. 20, 1967 2 Sheets-Sheet 2

United States Patent Office 3,538,406
Patented Nov. 3, 1970

3,538,406
BATTERY-POWERED RECORDER
Carl J. Snyder, Raleigh, N.C., assignor to Westinghouse Electric Corporation, Pittsburgh, Pa., a corporation of Pennsylvania
Filed Feb. 20, 1967, Ser. No. 617,117
Int. Cl. H02k 37/00
U.S. Cl. 318—138     1 Claim

ABSTRACT OF THE DISCLOSURE

A recorder employs a step motor for advancing a recording medium. The step motor is supplied with electric pulses of short duration controlled by a timing-pulse generator.

---

Excellent survey recorders are available which are energized from a 120 volt, 60 cycle power supply source. A survey recorder of this type is shown in my Pat. 3,059,239 which issued Oct. 16, 1962.

For general traffic survey use, a portable unit capable of operating for at least one month from an inexpensive storage battery is desirable. In a conventional battery-carry-over unit supplied with a survey recorder, such as that shown in my aforesaid patent, a current drain of the order .125 amperes at 12 volts is required. When empolyed in such a battery-carry-over unit, a storage battery such as one developed for use in popular automobiles would be capable of operating a survey recorder for a maximum time which is far less than the desired one-month period. Furthermore, such a carry-over unit is subject to a substantial timing error.

The object of the present invention is accordingly to provide a recorder for survey or similar service which is accurate and which is capable of making records for long periods of time without attention.

Another object is to provide an improved recorder or similar arrangement which is independent of any external power supply.

Another object is to provide such a recorder which is light in weight and readily movable to practically any desired location.

These foregoing objects are obtained by providing a a recorder in which standardized and commercially-available components, such as an automobile storage battery, a transistorized timing pulse generator, a pair of flip-flop switching elements, and a step motor are combined to form an accurate arrangement meeting commercial requirements for traffic surveys and similar uses. The timing-pulse generator is so designed that the current pulses it sends through the flip-flop switching elements flow for only a small fraction of the interval between successive pulses so that an average current drawn from the battery is small.

Other objects of the invention will be made evident on reading the following description taken with the drawings wherein:

FIG. 1 is a schematic view of a recorder in a preferred embodiment which employs a magnetic tape;

FIG. 2 is a plan view of a portion of the recorder of FIG. 1 together with schematic circuits therefor;

Figure 3:
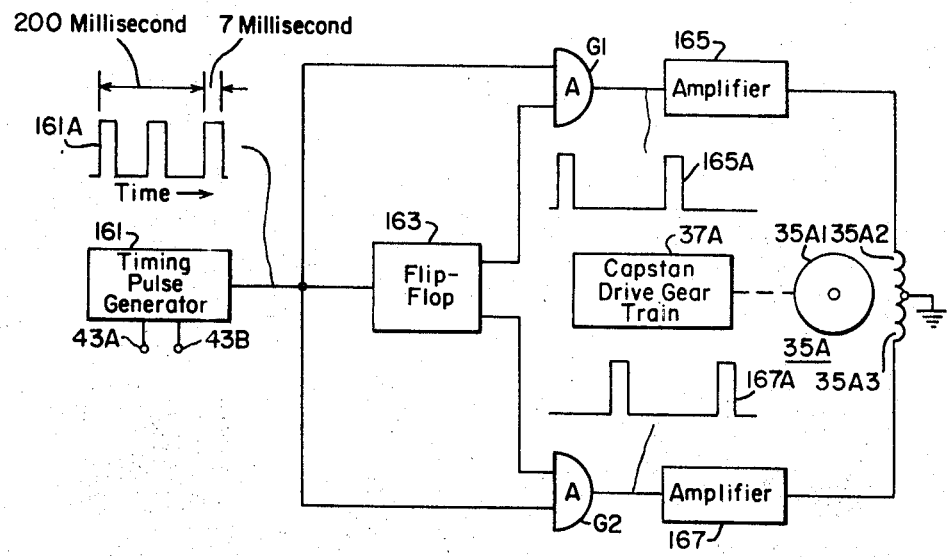
FIG. 3 is a schematic circuit diagram of a preferred combination of components for driving the tape.

Referring in detail to the drawings, FIG. 1 is a duplicate of FIG. 1 of my aforesaid patent. Similar reference characters are employed to identify similar components. In short, a payout reel 1 supplies magnetic tape 3 which passes over a guide roller 5, an erase head 7, a recorder head 9, and a reproduce head 11. The tape then passes between a capstan 13 and a biasing roller 15 and over a guide roller 17 to a takeup reel 19. The capstan 13 is rotated at a relatively slow rate such that the magnetic tape on the payout reel 1 which constitutes a chart roll is transferred to the takeup reel 19 in a period of the order of one month.

The present FIG. 2 is based on FIG. 2 of my aforesaid patent and includes a number of similar components which are identified by the same reference characters. Thus, the erase head 7, the record head 9, and the reproduce head 11 are connected to external circuits respectively through the two-pole single-throw switches 21, 23 and 51. A second set of heads 7a, 9a and 11a are connected to external circuits respectively through the switches 21a, 23a and 51a. Although invisible to the eye, magnetized small areas which the record head may have imprinted on the tape 3 are symbolized in FIG. 2 by reference numerals 33. When one of these small areas moves past the reproducing head 11 a voltage is induced in the windings thereof which will energize any load circuit connected thereto. The record head 9a is employed for recording time records which are represented symbolically by the circles 48.

If the apparatus is employed solely for recording purposes, the erase heads and the reproduce heads may be omitted.

As in the case of my aforesaid patent, a commutator 41 rotates with the capstan 13 and cooperates with a battery 43 and an amplifier 45 to apply pulses for timing purposes through the switch 23a to the recording head 9a.

In order to rotate the capstan 13 at a uniform rate a step motor 35A is coupled to the capstan through suitable gearing 37A. The step motor is of conventional construction and may include a permanent-magnet rotor 35A1 and an electromagnetic stator having two coils 35A2 and 35A3, each having a terminal connected to ground. The rotor of such a motor is advanced in discrete steps by the application of pulses alternately to the two coils. A motor of this type is disclosed in Bulletin A.W.H. MM 810 published in September, 1962, by the A. W. Haydon Company, Waterbury, Conn.

FIG. 3 is a schematic diagram of a preferred circuit for energizing the motor 35A. A timing-pulse generator 161 is employed for generating pulses at a suitable rate such as 10 pulses per second. A timing-pulse genertor is a commercially available unit consisting of a jeweled clock-type balance wheel having a permanent magnet. As the wheel oscillates the magnet passes between two coils triggering a transistor circuit which drives the balance wheel and provides the output pulse signals. The output pulses have a duration of 7 milliseconds. Thus, the average load on the battery supply is only 7% of the peak pulse current.

The output pulses from the timing-pulse generator are fed to a flip-flop switch 63 of well known form, preferably a transistor-type trigger flip-flop, and to two dual-input gates G1 and G2, which may be of any well known type. Conveniently, the gates may be of the AND type which provides an output only if both inputs are present. The companion input terminals of the gates G1 and G2 are connected respectively to the two output terminals of the flip-flop 163. Thus, when the timing-pulse generator applies a pulse to open the gate G1 and to switch the flip-flop to the "one" state, the gate G1 delivers a 7 millisecond pulse to the amplifier 165 which in turn energizes the coil 35A2 of the step motor 35A3. Such energization advances the rotor of the step motor through a predetermined angle, such as 15°.

A succeeding pulse from the timing-pulse generator switches the flip-flop to the "zero" state and also opens the gate G2. At the same time, the output of the flip-flop supplies a second energization to the gate G2 which delivers a 7 millisecond pulse to an amplifier 167. This amplifier in turn supplies a 7 millisecond pulse to the coil 35A3 of the step motor 35A. This advances the rotor of the step motor through another angle of 15°. The curves 165A and 167A show respectively the shapes of the pulses applied to the amplifiers 165 and 167. The gearing 37A is so selected that the motor 35A rotates the capstan 13 one revolution in 15 minutes.

As previously pointed out, the length of each current pulse represented by the curve 161A is only a small fraction of the time period separating successive pulses. Thus, current will be drawn from the energizing source or battery 43 of FIG. 2 for a correspondingly small fraction of the time of operation of the system. This makes possible the use of a storage battery as a source of energy for a period of the order of a month without attention.

Preferably, the amplifier and other components are transistorized and operate in a switching mode. Except for a slight leakage current, they only pass driving current through the motor when a pulse is received from the timing-pulse generator through the gates. An average current which does not exceed 25 milliamperes at 12 volts suffices to operate the complete motor and its drive. This represents an energy requirement of only 18 ampere hours for one month. With average temperature variations the timing-pulse generator is sufficiently accurate to keep the recorder on time within a very few minutes over a one month period.

While the speed of the motor 35 driven as above has been referred to as constant it actually rotates in rapidly repetitive steps. Such motion is entirely adequate for many applications, such as load surveys. For example, in FIG. 2, the record head 9 may be connected through the switch 23 and a pedal-operated switch 232 for energization from a source represented by the terminals 43A and 43B of the battery 43. The pedal switch 232 may be located in a highway for the purpose of making a traffic survey. Each vehicle passing over the pedal switch operates it in a manner well known in the art to produce a record of a vehicle passage on the tape 3. At the end of the load survey, which may be one month, the magnetic tape 3 may be removed from the recorder and placed in a translator (not shown) for the purpose of placing the information contained on the tape on cards in a manner well understood in the art. Alternatively, the information contained on the tape may be supplied to a computer for the purpose of obtaining any desired information therefrom.

Figure 4:
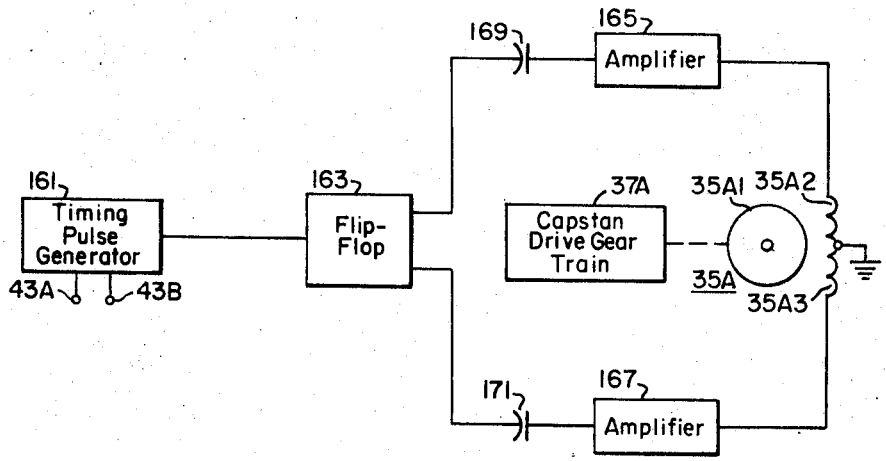
FIG. 4 is a similar diagram of an alternative circuit for performing the tape-driving function.

FIG. 4 is a schematic diagram of an alternative circuit for driving the step motor 35A. In FIG. 4 the timing-pulse generator again supplies pulses to th eflip-flop 163. However, the two outputs of the flip-flop are now coupled to the amplifiers 165 and 167 respectively through capacitors 169 and 171. The embodiment of FIG. 4 requires fewer components but produces a pulse shape which is somewhat less efficient than that obtained with the embodiment of FIG. 3.

I claim as my invention:

1. In a motor arrangement having an electric step motor provided with a rotor, first means for receiving an input and second means for receiving an input, the rotor being rotated in steps in response to alternate energizations of the first and second means, the improvement which comprises timing means for producing pulses at regular intervals for a period of several days and directing means responsive to said pulses for alternately energizing said first and second means in synchronism with said pulses throughout said period for times of the order of the duration of said pulses, the duration of each of said pulses being a small fraction of the period between successive pulses, said motor, timing means and directing means being energized from an electric battery, the spacing between successive pulses being more than ten times the duration of one of the pulses, said directing means comprising means for generating first signals at intervals corresponding to alternate ones of said pulses and means for generating second signals at intervals corresponding to the remainder of said pulses, first coincidence means responsive to each coincidence of one of said pulses and one of said first signals for supplying an input to the first means for the duration of such coincidence, and second coincidence means responsive to each coincidence of one of said pulses and one of said second signals for supplying an input to the second means for the duration of such coincidence, said first and second coincidence means each comprising a gate having said pulses for a first input and a second input of said first and second signals respectively, each of said gates being enabled to produce an output only during coincidence of the two inputs thereto, in combination with record head means coupled for energization from said electric battery, and translating means coupled to said step motor for moving a record medium relative to the record head means, whereby long-term records may be applied to the record medium by the battery-energized step-motor and record head means.

References Cited

UNITED STATES PATENTS

| | | | |
|---|---|---|---|
| 3,112,433 | 11/1963 | Fairbanks | 318—138 XR |
| 3,124,732 | 3/1964 | Dupy | 318—138 |
| 3,243,677 | 3/1966 | Cannalte et al. | 318—138 |
| 3,281,630 | 10/1966 | Liang | 318—138 |
| 3,317,803 | 5/1967 | Ikegami | 318—138 |
| 3,344,325 | 9/1967 | Sklaroff | 318—138 |
| 3,354,367 | 11/1967 | Stockebrand | 318—138 |
| 3,377,535 | 4/1968 | Yasuoka et al. | 318—138 |
| 3,218,535 | 11/1965 | Holthaus et al. | 318—138 |
| 3,250,066 | 5/1966 | Engelhardt et al. | 318—138 XR |

G. R. SIMMONS, Primary Examiner

U.S. Cl. X.R.

318—139